United States Patent Office.

HARRISON B. MEECH, OF CHATHAM VILLAGE, NEW YORK.

DRY-GROUND PULP.

SPECIFICATION forming part of Letters Patent No. 237,569, dated February 8, 1881.

Application filed July 3, 1880. (No specimens.)

*To all whom it may concern:*

Be it known that I, HARRISON B. MEECH, a citizen of the United States, residing at Chatham Village, in the county of Columbia and State of New York, have invented certain new and useful Improvements in Dry-Ground Pulp; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to a process of treating ordinary paper-pulp of rags, jute, straw, or other wet-pulped vegetable fiber in such manner that the fibers will be made dry and separate from each other, and be thus brought into suitable condition to evenly and thoroughly mix with oils, copal varnish, or other gums for various purposes.

The invention consists in first drying the pulp of rags, jute, straw, or other vegetable fiber which has been pulped wet, and then grinding or pulverizing the same, when dry, to a fine powder.

The invention consists, further, in the new article of manufacture produced by the aforesaid process—namely, a dry-powdered cellulose of rag-pulp or other vegetable wet-pulped paper-stock.

I take any paper-stock, such as rags, cotton, hemp, jute, straw, grass, or other similar or equivalent fibrous material, and reduce it to a pulp by any of the well-known processes in common use for reducing such fibers to pulp for the manufacture of paper. Then the said pulp is dried upon racks or wire-cloth in the open air or in a heated room; or it is preferably placed upon an apron and passed slowly through a long kiln heated by steam-pipes or furnaces, or otherwise, whereby the drying is more rapidly effected. The said pulp thus made thoroughly dry is then placed in a hopper and fed into a burr-stone mill, or other mill that will grind the same into a fine powder, and it is there so ground. The dry-ground cellulose thus formed may be used as an ingredient in different compositions for various purposes.

For paints I mix this dry-powdered cellulose with linseed or other suitable oils, or I mix the same with kerosene or other petroleum-oils, with clay or slaked lime, in such proportions as to form a compound of a proper consistency to be applied with a brush.

For making a water-proof paint I use twenty parts of the powdered cellulose, twenty parts of asbestus or mineral clay, and three parts of glycerine to about two gallons of silicate of soda and one quart of sulphuric acid, all thoroughly mixed and incorporated together, until the whole becomes a soft and pliable compound suitable for coating wood, paper, cloth, or leather to be used for various purposes.

For making a coating to apply to cloth or paper to resemble leather, I take a solution of gutta-percha, caoutchouc, or india-rubber, or copal mixed with soluble glass and glycerine and gum-arabic, and mix the same with a sufficient quantity of the dry-ground cellulose and china-clay to form a plastic composition. This composition is spread evenly upon and pressed firmly to the cloth or paper, dried, and embossed to imitate leather. Suitable pigments may be added to the composition to give it color.

For making an elastic fibrous plastic composition to apply to canvas to form floor-cloth, I take two parts of this powdered cellulose and one part of mineral paint and mix the same with a sufficient quantity of copal varnish and glycerine to form a composition of about the consistency of ordinary mortar. This composition, which may be colored by the addition of any suitable pigment, is applied to one or both sides of the canvas or burlaps.

What is claimed as the invention is—

1. The process of preparing paper-pulp for admixture with varnish, gums, or oils, the same consisting in first drying the pulp of rags, jute, straw, or other wet-pulped vegetable fibers and then grinding or pulverizing the same, when dry, to a fine powder, substantially as described.

2. As a new article of manufacture, a dry-powdered cellulose of rag-pulp or other vegetable wet-pulped paper-stock, substantially as described.

In testimony whereof I affix my signature in presence of two witnesses.

HARRISON B. MEECH.

Witnesses:
FORMAN WHITNEY,
JOHN J. BOYD.